United States Patent
Oqab et al.

(10) Patent No.: US 11,146,116 B2
(45) Date of Patent: Oct. 12, 2021

(54) SYSTEM AND METHOD FOR DISTRIBUTING POWER TO AIRCRAFT SYSTEMS

(71) Applicant: COLUMBIAD LAUNCH SERVICES INC., Kitchener (CA)

(72) Inventors: Haroon B. Oqab, Toronto (CA); George B. Dietrich, Kitchener (CA)

(73) Assignee: COLUMBIAD LAUNCH SERVICES INC., Kitchener (CA)

( * ) Notice: Subject to any disclaimer, the term of this patent is extended or adjusted under 35 U.S.C. 154(b) by 0 days.

(21) Appl. No.: 16/639,459

(22) PCT Filed: Aug. 17, 2018

(86) PCT No.: PCT/IB2018/056230
§ 371 (c)(1),
(2) Date: Feb. 14, 2020

(87) PCT Pub. No.: WO2019/035080
PCT Pub. Date: Feb. 21, 2019

(65) Prior Publication Data
US 2020/0389055 A1    Dec. 10, 2020

Related U.S. Application Data

(60) Provisional application No. 62/546,737, filed on Aug. 17, 2017.

(51) Int. Cl.
*H02J 50/30* (2016.01)
*H02J 50/80* (2016.01)
(Continued)

(52) U.S. Cl.
CPC ............. *H02J 50/30* (2016.02); *B64C 39/02* (2013.01); *B64C 39/024* (2013.01); *B64D 27/02* (2013.01);
(Continued)

(58) Field of Classification Search
CPC ....... H02J 50/30; H02J 2310/44; B64C 39/02; B64C 39/024; B64D 27/02; B64D 2221/00; B64F 1/362
See application file for complete search history.

(56) References Cited

U.S. PATENT DOCUMENTS 4,955,562 A    9/1990   Martin et al.
8,596,581 B2   12/2013  Criswell et al.
(Continued)

FOREIGN PATENT DOCUMENTS

KR    101750698 B1    6/2017

OTHER PUBLICATIONS

International Search Report dated Dec. 21, 2018 for PCT International Application No. PCT/IB2018/056230.
(Continued)

*Primary Examiner* — Jared Fureman
*Assistant Examiner* — Duc M Pham
(74) *Attorney, Agent, or Firm* — Perry + Currier Inc.

(57) ABSTRACT

A system and method for distributing power to racing aircraft systems is provided. The system includes a race course, a in power transmitter directed towards a power delivery section of the race course, the power transmitter configured to remotely transmit power to the aircraft systems at the power delivery section, and a controller operatively coupled to the power transmitter to activate, direct and deactivate the power transmitter. The method includes detecting, at the controller, a trigger condition for activating the power transmitter; responsive to detecting the trigger condition, activating the power transmitter; and transmitting the power to the aircraft systems.

25 Claims, 5 Drawing Sheets

(51) Int. Cl.
    *H02J 50/90*     (2016.01)
    *H02J 50/20*     (2016.01)
    *B64C 39/02*     (2006.01)
    *B64D 27/02*     (2006.01)
    *B64F 1/36*     (2017.01)

(52) U.S. Cl.
    CPC ............... *B64F 1/362* (2013.01); *H02J 50/20* (2016.02); *H02J 50/80* (2016.02); *H02J 50/90* (2016.02); *B64D 2221/00* (2013.01); *H02J 2310/44* (2020.01)

(56) References Cited

U.S. PATENT DOCUMENTS

| | | | | |
|---|---|---|---|---|
| 8,841,881 | B2* | 9/2014 | Failing | G06Q 20/10 |
| | | | | 320/109 |
| 2010/0096491 | A1 | 4/2010 | Whitelaw et al. | |
| 2014/0045405 | A1* | 2/2014 | Baarman | A63H 18/02 |
| | | | | 446/444 |
| 2015/0021442 | A1 | 1/2015 | Hunter et al. | |
| 2015/0311755 | A1 | 10/2015 | Hiebl et al. | |
| 2016/0009402 | A1 | 1/2016 | Hunter | |
| 2017/0183095 | A1 | 6/2017 | Liu et al. | |
| 2018/0095463 | A1* | 4/2018 | Castleman | G05D 1/0022 |
| 2018/0201370 | A1* | 7/2018 | Yang | H02J 50/10 |
| 2018/0257502 | A1* | 9/2018 | Park | B64F 1/007 |
| 2019/0023392 | A1* | 1/2019 | Micros | B64C 33/025 |
| 2020/0091774 | A1* | 3/2020 | Kim | G02B 27/0911 |

OTHER PUBLICATIONS

Written Opinion of the International Searching Authority dated Dec. 21 2018 for PCT International Application No. PCT/IB2018/056230.

International Preliminary Report on Patentability dated Nov. 26, 2019 for PCT International Application No. PCT/IB2018/056230.

* cited by examiner

SYSTEM AND METHOD FOR DISTRIBUTING POWER TO AIRCRAFT SYSTEMS

FIELD OF THE INVENTION

The present disclosure relates generally to aircraft systems. More particularly, the present disclosure relates to a system for distributing power to aircraft systems.

BACKGROUND

Advancements in aircraft systems have allowed aircraft systems to be available for non-commercial use. For example, aircraft systems may be used in sporting events such as races, where pilots navigate aircraft systems through a race course. However, due to the limited battery power of non-commercial aircraft systems, the races may be very short in duration, lasting only minutes or seconds, and require more time to set up and organize.

SUMMARY

An aspect of the present disclosure is directed to a system for racing aircraft systems. The system includes a race course through which the aircraft systems are to navigate; a power transmitter directed towards a power delivery section of the race course, the power transmitter configured to remotely transmit power to the aircraft systems at the power delivery section; and a controller operatively coupled to the power transmitter to activate, direct and deactivate the power transmitter to transmit power to the aircraft systems.

A second aspect of the present disclosure is directed to a method of remotely distributing power to a plurality of aircraft systems during a race through a race course. The method includes detecting, at a controller of a power transmitter, a trigger condition for activating the power transmitter, the power transmitter being remote from the plurality of aircraft systems; responsive to detecting the trigger condition, activating the power transmitter to transmit power; and transmitting the power to the aircraft systems.

DETAILED DESCRIPTION

The present disclosure generally relates to distributing power to aircraft systems during a race. To increase the duration of a race, aircraft systems may remotely receive power from a power transmitter at a power delivery section of a race course. The aircraft systems may be powered by laser beams, microwave beams, or other electromagnetic radiation. Aircraft systems may communicate a signal to a controller to activate a power source and emit power. The aircraft systems may remotely receive the power to enable longer flight times. The controller may activate and deactivate the power transmitter to distribute power to aircraft systems based on a threshold of power emitted, a threshold of power received by the aircraft systems, or a rule set for distributing power to two or more aircraft systems.

Figure 1:
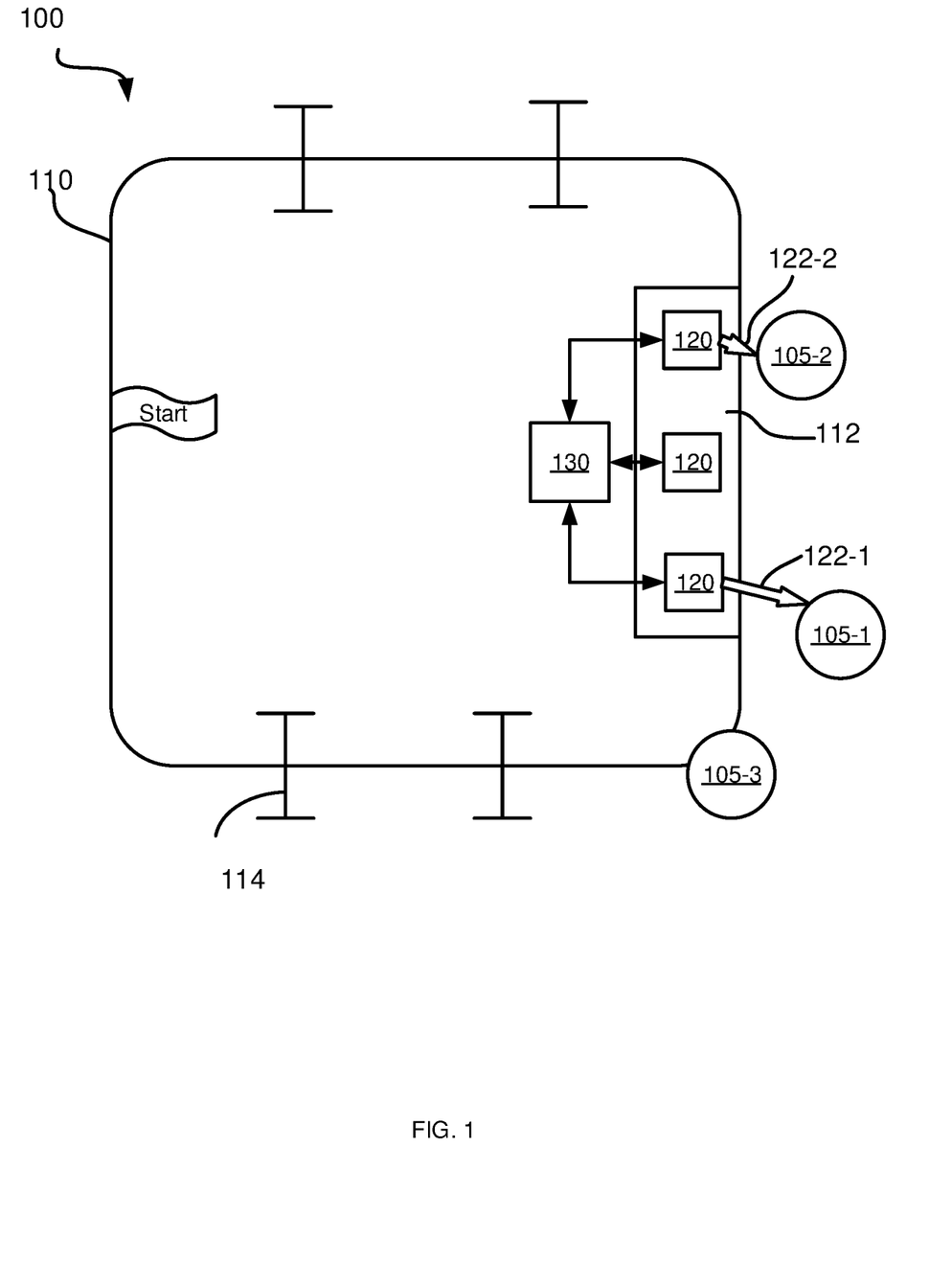
FIG. 1 shows a schematic diagram of an example system for racing aircraft systems.

FIG. 1 depicts a system 100 for racing aircraft systems 105-1, 105-2, 105-3 (referred to collectively as aircraft systems 105 and generically as an aircraft system 105). The system 100 includes a race course 110 through which the aircraft systems 105 are to navigate, a power delivery section 112 of the race course 110, a power transmitter 120 configured to remotely deliver power to the aircraft systems 105, and a controller 130 operatively coupled to the power source to activate, direct and deactivate the power transmitter 120.

The race course 110 may be a physical race course defined or delimited by physical elements 114 comprising physical components or obstacles, such as gates, poles, blocks, or the like. The aircraft systems 105 are therefore configured to navigate through air space around the elements 114. The elements 114 can be configured to track the passage of aircraft systems 105. The elements 114 can therefore include a computing device including sensors, receivers or the like for receiving signals or information from the aircraft systems 105. For example, the elements 114 can be configured to communicate with an aircraft system 105 to receive an identifier to provide updates to spectators or to other components of the system 100 regarding the location of the aircraft system 105. The elements 114 can thereby act as checkpoints of the race course.

In other implementations, the race course 110 may be a mixed reality-based race course defined or delimited by physical aspects of the race course 110, such as the physical track or space in which the race is held (e.g. a race track, sporting stadium, open field, urban area, or the like), as well as virtual reality and augmented reality components, such as computer-generated obstacles, gates, poles, blocks, or the like. The aircraft systems 105 are therefore configured to navigate through the air space according to the mixed reality components. In further implementations, the race course 110 may be a combination of a physical course with mixed reality components. The race course 110 may be oriented horizontally, such that the aircraft systems 105 navigate horizontally through the course 110 at approximately the same distance or height from the ground, or the race course 110 may be oriented vertically such that the aircraft systems 105 navigate towards and away from the ground through the course, or the race course may include horizontal and vertical navigation components. In some implementations, the race course 110 may span airspace over a property or group of properties or other large area.

The race course 110 also includes a power delivery section 112. The power delivery section 112 is a section of the race course where aircraft systems may remotely receive power from the power transmitter 120, as will be described in greater detail below. The race course 110 may have the power delivery section 112 integrated with the race course so that aircraft systems navigate through the power delivery section 112 as a part of the race course 110. In some embodiments, the power delivery section 112 may be located off-course from the race course 110, such that aircraft systems must navigate away from the race course 110 to receive power from the power transmitter 120, in the style of a pit-stop. The race course 110 may also include multiple power delivery sections 112 located at different sections of the race course 110. The power delivery sections 112 may be integrated with the race course 110, or may be off-course, or some power delivery sections 112 may be integrated with the race course 110 while others are off-course.

Figure 2:
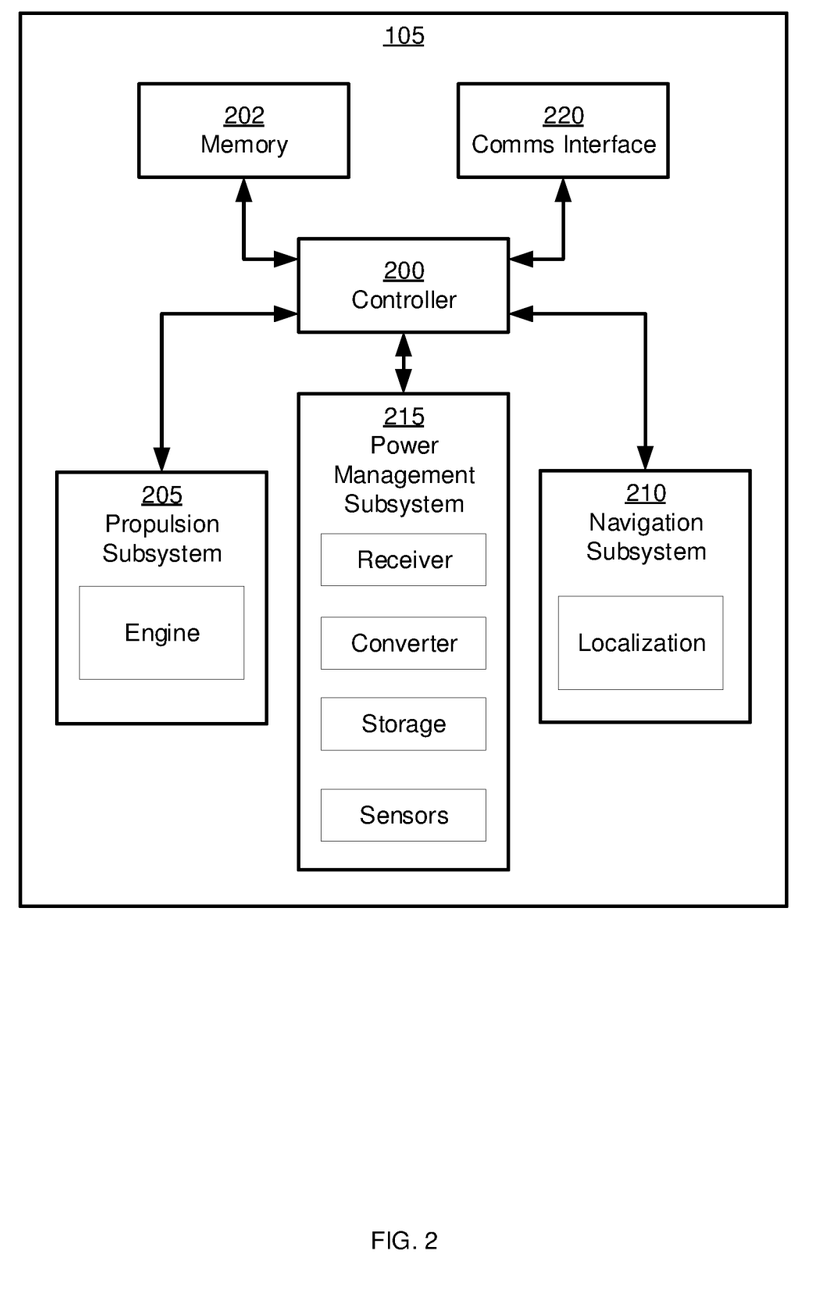
FIG. 2 shows a block diagram of an example aircraft system.

FIG. 2 depicts a block diagram of an aircraft system 105. The aircraft system 105 includes an aircraft controller 200 interconnected with a propulsion subsystem 205, a navigation subsystem 210, a power management subsystem 215 and a communications interface 220. The aircraft system 105 may be an unmanned aircraft systems (UAS), including autonomously controlled UASs and remotely piloted UASs.

The aircraft controller 200 may include a central-processing unit (CPU), a microcontroller, a microprocessor, a processing core, a field-programmable gate array (FPGA), or similar. The processor may include multiple cooperating processors. The aircraft controller 200 may cooperate with a memory 202 to execute instructions to realize the functionality discussed herein. The memory 202 may include any combination of read-only memory (ROM), random-access memory (RAM), flash memory, magnetic storage, optical storage, and similar. All or some of the memory 202 may be integrated with the controller 200. The controller 200 and memory 202 may be implemented as a computer. In particular, the controller 200 is configured to control the aircraft system 105 to navigate through the race course 110.

The propulsion subsystem 205 includes at least one engine and is configured to propel the aircraft system 105. For example, the propulsion subsystem 205 can include a propeller configured to be driven by the at least one engine to spin in an approximately vertical plane to provide thrust and lift (e.g. with fixed wings or the like), a rotor configured to be driven by the engine to spin in an approximately horizontal plane to provide lift, or other suitable mechanisms for propelling the aircraft system 105.

The navigation subsystem 210 can include sensors, beacons, localization systems, and the like to detect nearby aircraft systems 105 or elements 114. For example, the navigation subsystem 210 can include RADAR sensors, LIDAR sensors, optical sensors or the like. The navigation subsystem 210 can further include a global positioning system (GPS) receiver for receiving and processing signals from GPS satellites to obtain position information. The navigation subsystem 210 can be configured to generate map data indicative of the topography of the race course 110 and the elements 114 detected on the race course 110. The map data may be generated, for example based on GPS data, data received from the sensors and localization systems, and the like. The navigation subsystem 210 can further be configured to generate navigation data for navigating the aircraft system through the race course 110 and the elements 114 based on the map data. The navigation data can be used, for example, to allow the aircraft system 105 to navigate autonomously or to provide navigation data for display on a remote control system for a human operator. The navigation subsystem 210 can also include a repository, for example stored in the memory 202, for storing the map data and the navigation data.

The power management subsystem 215 includes a power receiver (referred to herein as simply a receiver) configured to receive power from the power transmitter 120, a power converter (referred to herein as simply a converter) configured to convert power received from the receiver into energy usable by the aircraft system 105, and an energy storage unit configured to store the usable energy. In some examples, one or more of the receiver, the converter, and the energy storage unit may be integrated. For example, the receiver may be integrated with the converter as a rectenna for receiving microwave radiation and rectifying the microwave radiation for conversion to direct current (DC) energy for use to power the aircraft system 105 (e.g. to power the engine for driving the propulsion subsystem 205). In other examples, the receiver may be configured to receive laser beams or other frequencies of electromagnetic radiation (e.g. low frequencies, infrared, ultraviolet, x-rays, gamma rays or the like). For example, the receiver and converter may be integrated as a solar cell configured to receive and convert solar energy.

In some implementations, the receiver may be located on an underside of the aircraft system 105, including a main body and wings, to increase the available surface area to receive power from the power transmitter 120. In other implementations, the receiver may cover the main body of the aircraft system 105, including a top side, to receive power from the power transmitter 120. The aircraft systems 105 may be configured to convert power received into energy and store the energy in the energy storage unit, or the aircraft systems 105 may convert the power into energy for powering the aircraft system 105 directly.

The energy storage unit is configured to receive energy from the converter and store the energy in an accessible form for the aircraft system 105. For example, the energy storage unit can include a rechargeable battery. In other examples, the energy storage unit can include using a superconducting magnetic energy storage (SMES) system. In particular, the SMES system stores energy in the form of magnetic field created by passing current through a superconductor (e.g. a superconducting coil). The SMES further includes a cryogenic coolant configured to cool the superconductor below its superconducting critical temperature, thereby reducing resistive losses when the SMES generates the magnetic field. The stored energy may subsequently be released for use to power the aircraft system 105 by discharging the coil. In further examples, the energy storage unit can include capacitors, inductors, or other suitable active and passive elements.

The power management subsystem 215 can further be configured to detect power emitted from the power transmitter 120, measure power received by the receiver, and monitor energy levels in the energy storage unit, for example using sensors or the like. The energy and/or power data obtained from the sensors can be stored in a repository of the power management subsystem 215 (e.g. stored in the memory 202) for further processing.

The communications interface 220 includes suitable hardware (e.g. transmitters, receivers, network interface controllers and the like) allowing the aircraft system 105 to communicate with other computing devices, such as other aircraft systems 105, over links including direct links, or links that traverse one or more networks (e.g. both local and wide-area networks). The specific components of the communications interface 220 are selected based on the type of network or other links that the aircraft system 105 communicates over.

For example, in an autonomously controlled aircraft system 105, the controller 200 can be configured to control the navigation subsystem 210 to detect and store map data of the race course 110 and to generate navigation data for navigating a path through the race course 110 based on the map data. In particular, the navigation subsystem 210 may be configured to detect and store the location of the power delivery section 112. Thus, for example, when the power management subsystem 215 detects a low energy level, the controller 200 can control the navigation subsystem 210 to generate navigation data for navigating the aircraft system 105 to the power delivery section 112. The controller 200 can then control the propulsion system to move the aircraft system 105 to the power delivery section 112 according to the navigation data.

In another example, the aircraft system 105 may receive navigation data via the communications interface 220 from a remote control system operated by a human operator piloting the aircraft system 105 through the race course 110. When the power management subsystem 215 detects a low energy level, the controller 200 can communicate a notification to the remote control system via the communications interface 220.

Figure 3:
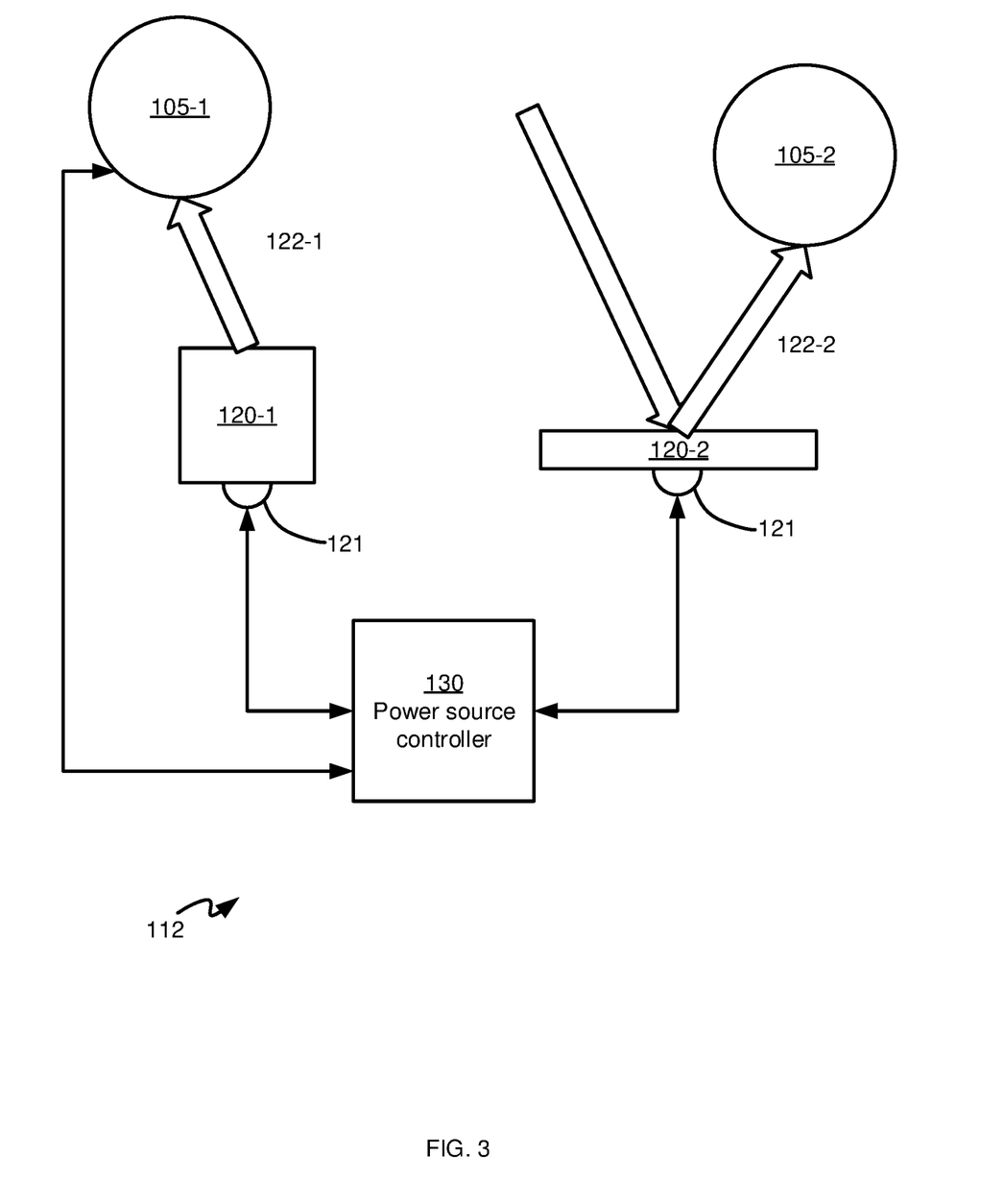
FIG. 3 shows a schematic diagram of a power distribution section and power transmitter of the system of FIG. 1.

FIG. 3 depicts the power delivery section 112 of the race course 110, including a first power transmitter 120-1 and a second power transmitter 120-2 and a power source controller 130. FIG. 3 also depicts aircraft systems 105-1 and 105-2 receiving power from the power transmitter 120 in the form of power beams 122-1 and 122-2.

Generally, the power transmitter 120 is configured to transmit power towards the power delivery section 112 of the race course 110. The power transmitter 120 is configured to remotely transmit power to the aircraft systems 105 at the power delivery section 112. For example, the power transmitter 120-1 includes a power source such as a laser, a transmitter chip, an antenna or another suitable power source configured to emit power in the form of microwave beams, laser beams, or other radiation at other frequencies on the electromagnetic radiation spectrum. In particular, the power source may emit a focused beam of power, such as beams 122-1 towards the aircraft system 105-1. In other examples, power may be emitted omnidirectionally by the power source. The power transmitter 120-2 is configured to receive and transmit power from an external source (e.g. solar energy). The power transmitter 120-2 can therefore include reflectors configured to redirect sunlight towards aircraft systems at the power delivery section 112 in the form of reflected beam 122-2. For example, the reflectors may be specially configured to focus sunlight for improved reception at the aircraft systems 105. Further, the power transmitters 120 can include positioning mechanisms 121 to position the power source and/or the reflectors to direct the power towards the power delivery section 112, or towards passing aircraft systems 105. For example, the positioning mechanisms 121 can reposition the reflectors responsive to passing aircraft systems 105 or to follow the sun.

In some implementations, the power transmitter 120 and/or the power deliver section 112 can be integrated with one or more of the elements 114. For example, the element 114 can be a gate having two side posts through which the aircraft systems 105 are to navigate. The power transmitter 120 can be configured to transmit power towards the power delivery section 112 between the two side posts such that the aircraft systems 105 remotely receive the power from the power transmitter 120 as the aircraft systems 105 pass between the two side posts. In another implementation, the element 114 can be a tunnel through which the aircraft systems 105 are to navigate. The power transmitter 120 can therefore include both a power source (e.g. a laser, a microwave emitter, or the like) configured to direct laser or microwave beams towards the tunnel, and reflectors configured to reflect the laser or microwave beams within the tunnel such that the aircraft systems 105 remotely receive power directly from the power source and from reflections off the reflectors. For example, the power source can be configured to emit the power omnidirectionally to increase the reflections within the tunnel. Further, the aircraft systems 105 can be configured to have receivers covering the main body of the aircraft systems 105, including the top side, to increase power received from any direction.

The power transmitter 120 may be physically located at the power delivery section 112 of the race course 110, such as a ground-based power source. For example, the power transmitter 120 may be disposed on a mobile platform, such as a truck, boat, or other aircraft system at the power delivery section 112. Alternately, the power transmitter 120 may be remote from the power delivery section 112 (e.g. located on a satellite) and configured to direct power towards the power delivery section 112.

For example, the power transmitter 120 can include a power relay system including satellites in low earth orbit (LEO), satellites in medium earth orbit (MEO), satellites in geostationary earth orbit (GEO), and other suitable relay elements (e.g. dirigibles or other aircraft systems) for relaying power between the relay elements and to the aircraft systems 105. For example, satellites in LEO, MEO, and GEO may beam or redirect power (e.g. microwaves, sunlight or the like) to charge the relay elements, which in turn beam or redirect the power to the aircraft systems 105. In particular, the relay elements include both power reception capabilities (e.g. including a receiver, converter and storage unit) and power transmission capabilities (e.g. including an emitter and/or reflector).

The controller 130 operatively coupled to the power source and is generally configured to activate, direct and deactivate the power transmitter 120. The controller 130 may include a central-processing unit (CPU), a microcontroller, a microprocessor, a processing core, a field-programmable gate array (FPGA), or similar. The processor may include multiple cooperating processors. The controller 130 may cooperate with memory to execute instructions to realize the functionality discussed herein. The memory may include any combination of read-only memory (ROM), random-access memory (RAM), flash memory, magnetic storage, optical storage, and similar. All or some of the memory may be integrated with the controller 130. The controller 130 and memory may be implemented as a computer.

The power transmitter 120 and controller 130 may each include a network interface configured for bidirectional data communications and can include a network adaptor and driver suitable for the type of network. Examples of suitable computer networks include internet protocol (IP) networks, such as intranet, a local-area network, a wide-area network, a virtual private network (VPN), a Wi-Fi network, a short-range wireless network (e.g., Bluetooth or Bluetooth Low Energy), the internet, combinations of such, and similar. The power transmitter 120 and controller 130 may each include a port and controller for other types of communications, such as USB communications.

In operation, the controller 130 is coupled to the power transmitter 120 to activate and direct the power transmitter 120 in response to detecting a trigger condition and deactivate the power transmitter 120 in response to detecting a stop condition as will be described in further detail below. The activating and directing the power transmitter 120 can include activating the power source, controlling the positioning mechanisms for the power source, and controlling the positioning mechanisms for the reflectors to allow power to be directed towards the power delivery section 112 of the race course 110. Deactivating the power transmitter 120 can include deactivating the power source, controlling the positioning mechanisms for the power source, and controlling the positioning mechanisms for the reflectors to stop power from being directed towards the power delivery section 112.

Figure 4:
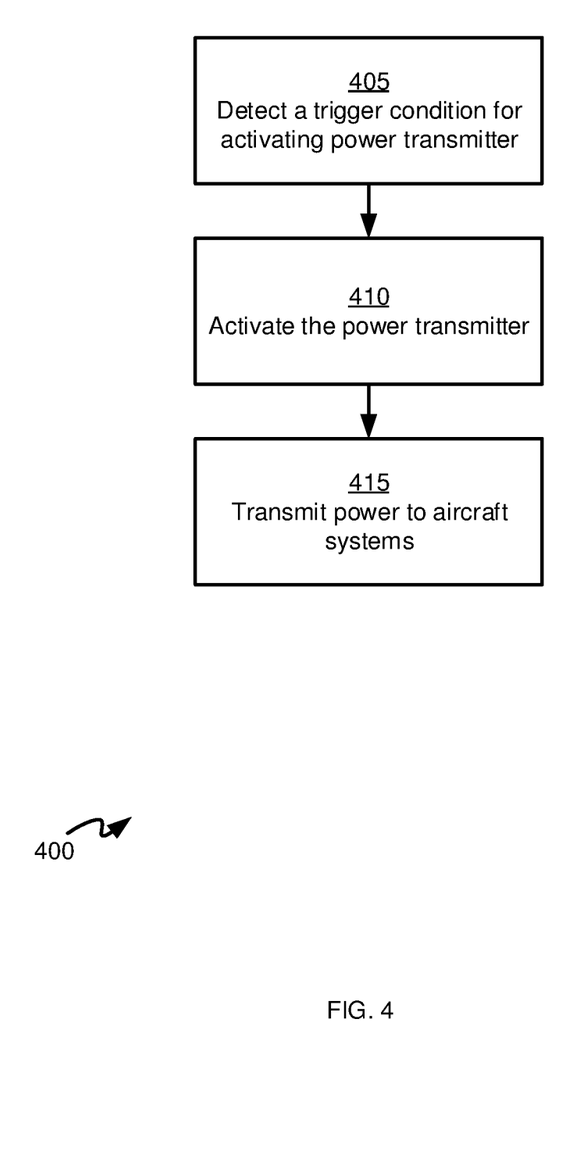
FIG. 4 shows a flowchart of an example method of distributing power to aircraft systems during a race.

FIG. 4 depicts a flowchart of a method 400 of remotely distributing power to a plurality of aircraft systems. In order to assist in the explanation of the method 400, it will be assumed that the method 400 is performed using the system 100, although it is contemplated that the method 400 can also be performed by other suitable systems.

At block 405, the controller 130 detects a trigger condition for activating the power transmitter.

For example, the trigger condition may be a threshold proximity of an aircraft system 105 to the power delivery section 112. The controller 130 may detect an aircraft system 105 (e.g. via sensors or the like) near the power delivery section 112, or the controller 130 may receive a signal from an aircraft system 105 including data regarding a position and velocity of the aircraft system 105. In some implementations, the aircraft system 105 can periodically send signals containing data regarding position and velocity, and the controller 130 can be configured to estimate a future position (e.g. by comparing first and second positions or using the velocity data). When the aircraft system 105 is determined to be within a predefined distance (i.e. within the threshold proximity) of the power delivery section 112, the controller 130 can be configured to activate the power transmitter 120.

In another example, the trigger condition may be a threshold proximity of an aircraft system 105 to an element 114 acting as a checkpoint. For example, the aircraft system 105 can be configured to send a signal to the controller 130 upon detecting the element 114. Alternately the element 114, in particular a computing device at the element 114, can be configured to send a signal to the controller 130 based on an aircraft system 105 passing the element 114. For example, the computing device of the checkpoint (i.e. element 114) may be configured to detect the aircraft system 105 (e.g. via sensors or the like). In other examples, the element 114 can be configured to receive signals containing data regarding position and velocity from the aircraft system 105, and relay the signals to the controller 130.

In further implementations, the trigger condition may be detected by receiving a signal from an aircraft system 105, the signal including a request to activate the power transmitter 120. In still further implementations, the trigger condition may be detected by detecting a predefined maneuver by an aircraft system 105 (e.g. via sensors at the element 114 or the controller 130. The controller may be configured to proceed to block 410 upon detection of one or more or a combination of the above and other suitable trigger conditions At block 410, responsive to detecting the trigger condition, the controller 130 is configured to activate the power transmitter 120. For example, the controller 130 can be configured to activate a power source, such as a laser or a microwave emitter, of the power transmitter 120. In other examples, the controller 130 can be configured to control the positioning mechanisms, for example to orient reflectors to enable reflection of power beams towards the power delivery section 112.

At block 415, the power transmitter 120 is configured to transmit power to the aircraft systems 105 in the power delivery section 112, for example in the form of laser beams, microwave beams or other electromagnetic radiation. In some implementations, the controller 130 directs the power transmitter 120 to direct a power beam 122 towards the aircraft system 105 or towards a predicted location of the aircraft system 105 based on the position and velocity data received at block 405.

In other implementations, the power transmitter 120 may be configured to emit power omnidirectionally. For example, the power transmitter 120 may emit power beams 122 omnidirectionally in the power delivery section 112 of the race course. The power delivery section 112 may be contained in a tunnel configured to reflect the power beams 122 so that as the aircraft systems 105 navigate through the tunnel, the aircraft systems 105 are likely to receive power from at least one power beam 122 or its reflection.

Figure 5:
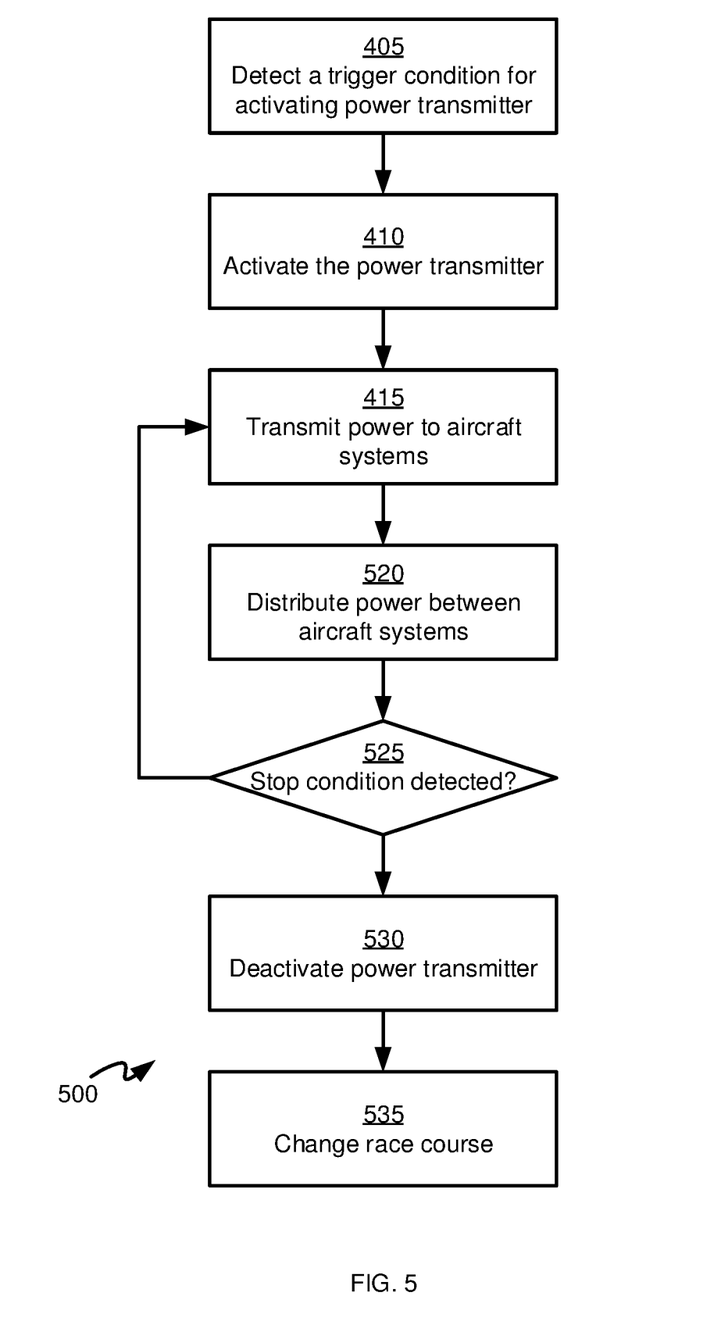
FIG. 5 shows a flowchart of another example method of distributing power to aircraft systems during a race.

Referring now to FIG. 5, an example method 500 of remotely distributing power to a plurality of aircraft systems is depicted. In order to assist in the explanation of the method 500, it will be assumed that the method 500 is performed using the system 100, although it is contemplated that the method 500 can also be performed by other suitable systems.

The method 500 includes the blocks 405, 410, and 415 as described above. The system 100 is then configured to proceed to block 520.

At block 520, the controller 130 is configured to direct the power transmitter 120, for example by controlling the power transmitter and the positioning mechanism, to distribute power between two or more aircraft systems 105 of the plurality of aircraft systems based on a rule set. The rule set may consider the order in which the aircraft systems 105 arrive at the power delivery section 112, the amount of power the aircraft systems 105 have remaining, the amount of power already received by the aircraft systems 105 from the power source, the distance from the power transmitter 120 and other similar conditions.

At block 525, the controller 130 is configured to determine whether a stop condition is detected. If no stop condition is detected at block 525, the controller 130 proceeds to block 415 and continues to transmit power to the aircraft systems 105.

For example, the stop condition may be a threshold amount of power emitted to the plurality of aircraft systems 105 by the power transmitter 120. The first threshold amount of power emitted may be used for example, in conjunction with multiple power delivery sections 112 and power transmitters 120 at different locations as part of a race mechanism. For example, each power transmitter 120 may only emit some certain maximum units of power, thereby requiring racers to make strategic decisions regarding which power transmitter 120 to navigate to.

In another example, the stop condition may be a threshold amount of power received by one or more aircraft systems 105. For example, the aircraft systems 105 may be configured to send signals containing data regarding power received by the respective aircraft system 105. The threshold amount of power received by one or more aircraft systems 105 may be based on a maximum amount of power that can be safely stored by one of the aircraft systems 105. The second threshold condition may also be incorporated into a race mechanism, for example that the aircraft systems 105 receive a maximum number of units of power from each power transmitter 120 and may require racers to navigate through at least a certain number of power delivery sections 112 including power transmitters 120 to receive the requisite power to complete the course.

In further implementations, the stop condition may be detected by receiving a signal from an aircraft system 105, the signal including a request to deactivate the power transmitter 120. For example, as part of a race mechanism, the aircraft systems 105 may be permitted to deactivate a power transmitter 120.

If a stop condition is detected at block 525, the controller 130 is configured to proceed to block 530. The controller 130 may be configured to proceed to block 530 upon detection of one or more or a combination of the above and other suitable stop conditions.

At block 530, responsive to detecting the stop condition, the controller 130 is configured to deactivate the power transmitter 120. For example, the controller 130 can be configured to deactivate the power source, such as a laser or a microwave emitter, of the power transmitter 120. In other examples, the controller 130 can be configured to control the positioning mechanisms, for example to orient reflectors to disable reflection of power beams towards the power delivery section 112.

At block 535, before or after receiving power from power transmitter 120, and the race course 110 may change from lap to lap. For example, upon one or more of the aircraft systems 105 passing a checkpoint, the race course 110 may change, for example by changing the computer-generated (virtual) elements of the race course, by resetting and/or changing the power distribution rules, or the like.

A system and method for distributing power to aircraft systems is provided. During a race, aircraft systems may be configured to receive power at a power delivery section of a race course from a power transmitter. The power transmitter may transmit power in the form of microwave beams, laser beams, sunlight, or other electromagnetic radiation to allow the aircraft systems to remotely receive energy, thereby increasing the flight time aircraft system and the duration of the race. Further, the power transmitter may be disposed on a mobile platform (e.g. a truck or the like) or on a satellite remote from the race course, thereby allowing for flexibility in locations of the race course and reducing equipment and setup time required for races.

In operation, a controller is configured to detect a trigger condition for activating the power transmitter. The trigger condition can be a threshold proximity of an aircraft system to the power delivery section, a threshold proximity of an aircraft system to an element acting as a checkpoint, receipt of a signal from an aircraft system or an element for activating the power transmitter, or other suitable trigger conditions. The controller is then configured to activate and direct the power transmitter towards the power delivery section. Thus, the system provides can provide increased efficiency by transmitting power only when an aircraft system is at or near the power delivery section. The controller can further be configured to deactivate the power transmitter based on detection of a stop condition, such as a threshold of power emitted, a threshold of power received by aircraft systems, or a rule set for distributing power to two or more aircraft systems. The system therefore reduces overpowering of the aircraft systems and allows for the race to be more dynamic.

Persons skilled in the art will appreciate that there are yet more alternative implementations and modifications possible, and that the above examples are only illustrations of one or more implementations. The scope, therefore, is only to be limited by the claims appended hereto.

The invention claimed is:

1. A system for racing aircraft systems comprising:
   a race course including a plurality of physical elements through which the aircraft systems are to navigate;
   a power delivery section of the race course including at least one of the plurality of the physical elements;
   a power transmitter integrated with the at least one of the plurality of physical elements, the power transmitter directed towards the power delivery section of the race course, the power transmitter configured to remotely transmit power to and between the aircraft systems at the power delivery section; and
   a controller operatively coupled to the power transmitter to activate, direct and deactivate the power transmitter to transmit power to the aircraft systems.

2. The system of claim 1, wherein the power transmitter comprises:
   a laser configured to emit laser beams to remotely transmit power to and between the aircraft systems; and
   a positioning mechanism coupled to the laser to direct the laser beams.

3. The system of claim 1, wherein the power transmitter comprises:
   a microwave emitter configured to emit microwave beams to remotely transmit power to and between the aircraft systems; and
   a positioning mechanism coupled to the microwave emitter to direct the microwave beams.

4. The system of claim 1, wherein the power transmitter comprises:
   a reflector configured to reflect sunlight to remotely transmit power to and between the aircraft systems; and
   a positioning mechanism coupled to the reflector to direct the reflected sunlight towards the aircraft systems.

5. The system of claim 1, wherein the aircraft systems are remotely piloted.

6. The system of claim 1, wherein the aircraft systems are manned.

7. The system of claim 1, wherein the aircraft system comprises:
   a propulsion subsystem including at least one engine, the propulsion subsystem configured to propel the aircraft system;
   a navigation subsystem configured to navigate the aircraft system; and
   a power management subsystem including a power receiver configured to receive power from the power transmitter, a power converter configured to convert the power from the power receiver into usable energy to power the aircraft system, and an energy storage unit configured to store the usable energy for powering the aircraft system.

8. The system of claim 7, wherein the power management subsystem further comprises sensors to detect power emitted from the power transmitter, measure power received by the power receiver, and monitor energy stored by the energy storage unit.

9. The system of claim 7, wherein the navigation subsystem further comprises a localization system to find nearby aircraft systems.

10. The system of claim 1, wherein the controller is further configured to activate the power transmitter when aircraft systems are within a predefined distance from the power delivery section.

11. The system of claim 1, further comprising an additional power transmitter located on a satellite remote from the power delivery section of the race course, wherein the additional power transmitter is configured to remotely transmit additional power to the aircraft systems at the power delivery section of the race course.

12. A method of remotely distributing power to and between a plurality of aircraft systems during a race through a race course, the method comprising:
   detecting, at a controller of a power transmitter, an aircraft system of the plurality of aircraft systems within a predefined proximity of the power transmitter, the power transmitter being integrated with a physical element of the race course through which the aircraft systems are to navigate;

detecting, at the controller of a power transmitter, a trigger condition for activating the power transmitter, the trigger condition based on the aircraft system;

responsive to detecting the trigger condition, activating the power transmitter to transmit power; and transmitting the power to and between the aircraft systems.

13. The method of claim 12, wherein detecting the trigger condition comprises receiving a signal from the aircraft system, the signal including data regarding a position and a velocity of the aircraft system.

14. The method of claim 13, wherein receiving the signal further comprises receiving periodic signals from the aircraft system, the periodic signals including data regarding the position and the velocity of the aircraft system.

15. The method of claim 13, wherein transmitting the power comprises directing the power transmitter to direct power towards the aircraft system based on the position and the velocity of the aircraft system.

16. The method of claim 12, wherein detecting the trigger condition comprises receiving a signal from a computing device at a checkpoint of the race course based on the aircraft system passing the checkpoint.

17. The method of claim 12, wherein detecting the trigger condition comprises receiving a signal from the aircraft system, the signal including a request to activate the power transmitter.

18. The method of claim 12, wherein detecting the trigger condition comprises detecting, by the controller, a predefined maneuver by the aircraft system.

19. The method of claim 12, further comprising:
detecting, at the controller, a stop condition for deactivating the power transmitter; and
responsive to detecting the stop condition, deactivating the power transmitter.

20. The method of claim 19, wherein detecting the stop condition comprises detecting a threshold amount of power emitted to the plurality of aircraft systems by the power transmitter.

21. The method of claim 19, wherein detecting the stop condition comprises:
receiving signals containing data regarding power received by respective aircraft systems of the plurality of aircraft systems; and
deactivating the power transmitter based on the signals.

22. The method of claim 19, wherein detecting the stop condition comprises receiving a signal from a second aircraft system of the plurality of aircraft systems, the signal including a request to deactivate the power transmitter.

23. The method of claim 12, further comprising distributing power between two or more aircraft systems of the plurality of aircraft systems based on a rule set.

24. The method of claim 12, further comprising changing the race course from lap to lap.

25. A system for racing a plurality of remotely piloted aircraft systems comprising:
a race course including a plurality of physical elements through which the plurality of aircraft systems are to navigate;
a power delivery section of the race course including at least one of the plurality of the physical elements;
a power transmitter integrated with the at least one of the physical elements, the power transmitter configured to remotely transmit power to the plurality of aircraft systems at the power delivery section; and
a controller operatively coupled to the power transmitter to:
activate the power transmitter to transmit power to at least one aircraft system when the at least one aircraft system is within a predefined distance from the power delivery section;
control a positioning mechanism of the power transmitter to direct power towards the at least one aircraft system;
control the power transmitter and the positioning mechanism to distribute power between two or more of the plurality of aircraft systems; and
deactivate the power transmitter.

* * * * *